(12) United States Patent
Jurca et al.

(10) Patent No.: US 10,864,911 B2
(45) Date of Patent: Dec. 15, 2020

(54) AUTOMATED DETECTION OF HAZARDOUS DRIFTING VEHICLES BY VEHICLE SENSORS

(71) Applicant: CONTINENTAL AUTOMOTIVE GMBH, Hannover (DE)

(72) Inventors: Razvan-Calin Jurca, Timisoara (RO); Nicolae Pahontu, Campia Turzii (RO)

(73) Assignee: Continental Automotive GmbH, Hannover (DE)

( * ) Notice: Subject to any disclaimer, the term of this patent is extended or adjusted under 35 U.S.C. 154(b) by 304 days.

(21) Appl. No.: 15/915,438

(22) Filed: Mar. 8, 2018

(65) Prior Publication Data

US 2018/0257647 A1   Sep. 13, 2018

Related U.S. Application Data

(63) Continuation-in-part of application No. PCT/EP2016/070652, filed on Sep. 1, 2016.

(30) Foreign Application Priority Data

Sep. 10, 2015 (EP) .................................... 15465539
Mar. 7, 2018 (DE) ......................... 10 2018 203 376

(51) Int. Cl.
*B60W 30/095* (2012.01)
*G01S 13/931* (2020.01)
(Continued)

(52) U.S. Cl.
CPC ...... *B60W 30/0956* (2013.01); *B60W 30/095* (2013.01); *B60W 30/0953* (2013.01);
(Continued)

(58) Field of Classification Search
None
See application file for complete search history.

(56) References Cited

U.S. PATENT DOCUMENTS

| 9,147,353 B1 * | 9/2015 | Slusar | G08G 1/0129 |
| 2014/0214265 A1 * | 7/2014 | Ashton | G07C 5/0816 |
| | | | 701/33.5 |

(Continued)

FOREIGN PATENT DOCUMENTS

| EP | 1065520 A2 | 1/2001 |
| EP | 1354767 A2 | 10/2003 |

(Continued)

OTHER PUBLICATIONS

International Search Report and Written Opinion dated Nov. 28, 2016 from corresponding International Patent Application No. PCT/EP2016/070652.

(Continued)

*Primary Examiner* — Lail A Kleinman

(57) ABSTRACT

A method and device for determining an anomalous driving pattern of a neighboring vehicle using a vehicle camera and/or other sensor is described. Image data is received and if suitable lane markings are detected, a reference trajectory is derived from the detected lane markers. Otherwise, a reference trajectory is derived from a motion of the present vehicle. A trajectory of the neighboring vehicle is determined, characteristic parameters of the detected trajectory are derived, and the characteristic parameters are compared with predetermined trajectory data. Based on the comparison it is determined if the trajectory of the neighboring vehicle is an anomalous trajectory and in one case an alert signal is generated.

11 Claims, 11 Drawing Sheets

(51) Int. Cl.
  *G01S 7/41*   (2006.01)
  *G06K 9/00*   (2006.01)
  *B60W 40/09*  (2012.01)
  *B60W 50/14*  (2020.01)
  *G01S 13/86*  (2006.01)

(52) U.S. Cl.
  CPC ............ *B60W 40/09* (2013.01); *B60W 50/14* (2013.01); *G01S 7/415* (2013.01); *G01S 13/931* (2013.01); *G06K 9/00791* (2013.01); *G06K 9/00798* (2013.01); *B60W 2050/143* (2013.01); *B60W 2050/146* (2013.01); *B60W 2420/42* (2013.01); *B60W 2554/804* (2020.02); *B60W 2555/00* (2020.02); *B60W 2754/10* (2020.02); *B60W 2754/30* (2020.02); *B60W 2754/50* (2020.02); *G01S 13/867* (2013.01); *G01S 2013/9323* (2020.01)

(56) References Cited

U.S. PATENT DOCUMENTS

| 2015/0194057 | A1* | 7/2015  | Jin        | B62D 15/0255  |
|              |     |         |            | 348/148       |
| 2016/0035220 | A1* | 2/2016  | Paromtchik | B60W 40/09    |
|              |     |         |            | 701/117       |
| 2016/0313133 | A1* | 10/2016 | Zeng       | B60W 60/00272 |
| 2017/0210379 | A1* | 7/2017  | Obata      | B60W 30/0956  |

FOREIGN PATENT DOCUMENTS

| EP | 2012211 A1 | 1/2009 |
| EP | 2169427 A1 | 3/2010 |

OTHER PUBLICATIONS

European Search Report dated Mar. 23, 2016 for corresponding European Patent Application No. 15465539.3.

* cited by examiner

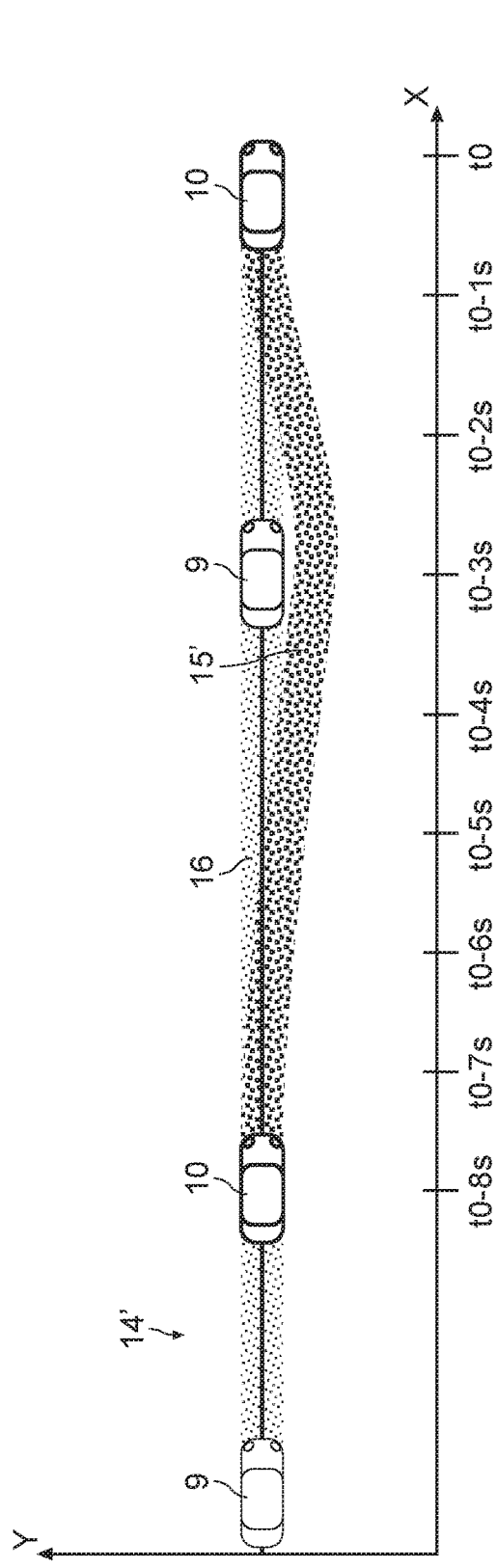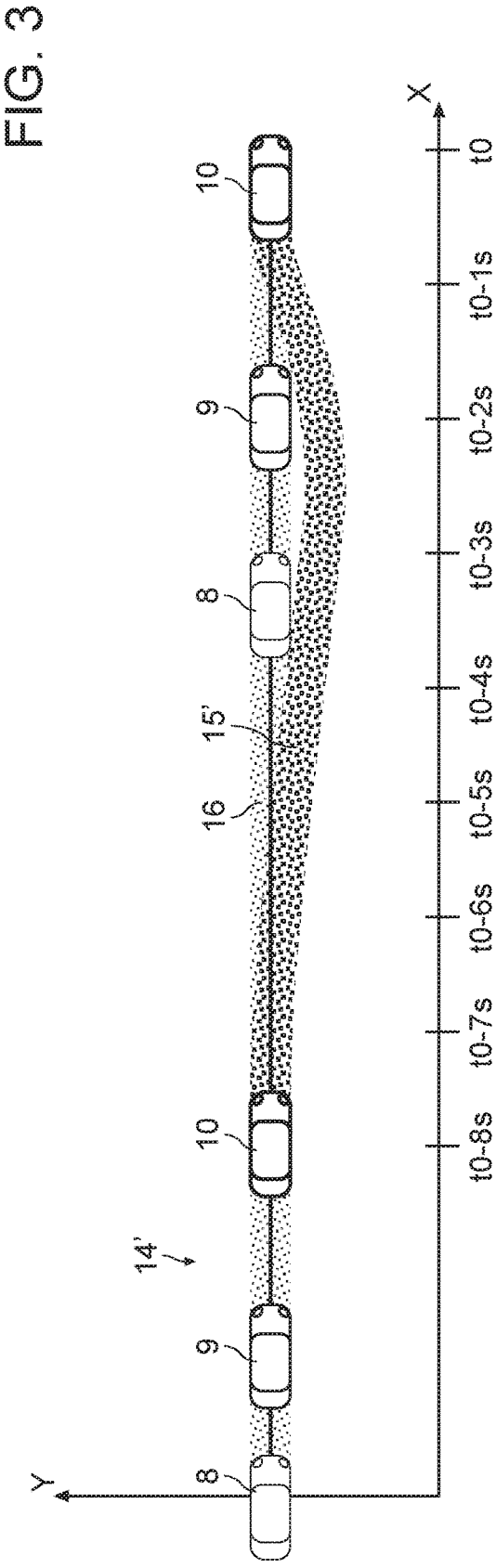

AUTOMATED DETECTION OF HAZARDOUS DRIFTING VEHICLES BY VEHICLE SENSORS

CROSS REFERENCE TO RELATED APPLICATION

This application is a continuation-in-part of International application No. PCT/EP2016/070652, filed Sep. 1, 2016, which claims priority to European patent application No. EP15465539, filed Sep. 10, 2015, and also claims priority to German patent application No. 10 2018 203 376.5, filed Mar. 7, 2018, each of which is hereby incorporated by reference.

TECHNICAL FIELD

The technical field relates generally to a system and method for the detection of irregular or anomalous trajectories of a neighboring vehicle, and in particular of a vehicle driving in front of a present vehicle.

BACKGROUND

The camera sensors of an advanced driver assistance system ("ADAS") capture periodical images of the traffic and process them to extract relevant information about the traffic, such as the vehicles, the pedestrians, other moving objects, the lines of the traffic lanes, the lights of the vehicles, etc.

For this purpose, mostly front view mono-cameras are used, but additional ADAS camera sensors, such rear cameras, side cameras, surround view cameras or stereo cameras can also be used. The cameras are used to implement different detection functions, for example driver assist or driver alert functions.

Further kinds of sensors include radar and lidar sensors. ADAS radar sensors use the radio waves for measuring the distances to obstacles and to the vehicles in traffic in a given area surrounding the vehicle. The radar sensors are also used to measure the speed of vehicles in traffic.

Lidar sensors measure the distance to the vehicles and obstacles that reflects the laser light pulses emitted by the sensor. The distance and angular position is determined by the optical characteristics of the opto-electronic components.

Various safety and comfort functions of vehicles are implemented using ADAS sensors. They include automated cruise control ("ACC"), blind spot detection ("BSD"), autonomous emergency braking, emergency brake assist ("EBA"), lane departure warning ("LDW"), etc.

SUMMARY

According to the present specification, data that is collected by ADAS sensors, for example, an ADAS forward mono camera, a stereo camera, an ADAS rear view camera, an ADAS surround view camera, an ADAS Radar, or ADAS Lidar, and/or received by V2X communications, may be used to:

1) Detect if a vehicle in front moves in a sinuous line or deviates from its traffic lane.
2) Detect if a rear vehicle moves in a sinuous line or deviates from its traffic lane.
3) Detect if the vehicles on the lateral traffic lanes move in a sinuous line or deviate from their traffic lanes.
4) Identify the vehicles whose drivers are affected by fatigue and/or other adverse conditions in a hazardous grade based on the moving trajectory of the vehicle.
5) Inform or alert the driver when a potentially dangerous vehicle is detected in the close vicinity, e.g., before an overtaking maneuver.
6) In case of critical hazardous situations, alert the driver from the hazardous vehicle using the existing communication channels, such as visual, acoustic and radio frequency transmissions.
7) In response to the detection of a potentially dangerous vehicle by an ego-vehicle, i.e., a highly or fully automated driving vehicle, the driving path of the ego-vehicle may be altered and/or other corrective measures performed.
8) Initiate a data recording from ADAS sensors and/or V2X communications, such as example images from camera sensors, when a critical hazardous situation is detected by the system. Among others, the recording can help to determine later insurance claims, other types of compensations and penalties in the case of a road accident.

Among others, a method or system according to the present specification may provide the following advantages:

A) Increase of the Safety aspects when driving near a vehicle in which a driver is heavily affected by fatigue.
B) Decrease of the probability of collisions.
C) For the Autonomous Cruise Control (ACC) with follow mode the vehicle will be able to alert the driver when the preceding vehicle is driven hazardously.
D) For Highly or Fully Automated Driving Vehicles, the vehicle will inform the driver about the potential danger.

The present application discloses a system that calculates the trajectories of the vehicles within the vicinity and two methods to identify the vehicles that move anomalous and hazardous on the traffic lanes.

The system includes camera sensors and a computing unit. By way of example, the camera sensors of the system could be provided by ADAS camera sensors, which are already present in the vehicle. The computing unit can be provided as an independent electronic unit or as one of the microcontrollers, which is already integrated in an existing sensor, especially in a camera sensor, or in an electronic unit of the vehicle.

In order to increase the accuracy, the system can integrate data from the other kinds of ADAS sensors, such as radar and lidar sensors. Thereby, a precision of locating the vehicles within the vicinity of the present car can be increased.

The present specification discloses a computer implemented method for determining an anomalous driving pattern of a neighboring vehicle with a vehicle camera of a present vehicle. In particular, the neighboring vehicle can be a preceding vehicle, which drives in front of the present vehicle.

Image data is received from one or more vehicle cameras. The image data includes image frames with image data of the neighboring vehicle. The image data is scanned for lane markings and lane boundaries of a lane in which the present vehicle is driving. The scanning for those image features is performed using image processing methods, such as edge recognition, Hough transform, determination of vanishing points and so forth.

If image data corresponding to lane markings is detected in the image frames it is determined if the detected lane markings are suitable for deriving a trajectory of the neighboring vehicle relative to the lane markings. In a simple embodiment, this involves detecting if the length of the lane markers in the image data is sufficient to establish a reference direction.

If it is determined that the detected lane markings are suitable to derive the trajectory, a reference trajectory is derived from the detected lane markings. In an exemplary embodiment, the image data is processed frame by frame and the positions of the lane markers in the respective image frame are used as a reference trajectory. In another embodiment, the position of the lane markers is tracked, for example with a Kalman filter, and the reference trajectory is derived from the tracked trajectory of the lane markers.

If no lane markers are detected or if the lane markers are not suitable for deriving a reference trajectory, the reference trajectory is derived from a motion of the present vehicle. The motion of the present vehicle may be derived, among others, from motion sensor data, such as the steering angle and the vehicle speed, from data of a positioning system such as GPS, from the apparent motion of stationary objects in the image frames of the vehicle camera or from a combination of those data.

A trajectory of the neighboring vehicle relative to the reference trajectory is determined, and characteristic parameters of the determined trajectory are derived, such as a lateral motion to the left or the right, the speed of the lateral motion, the curvature of the trajectory and so forth.

The characteristic parameters are compared to or matched with predetermined trajectory data. The predetermined trajectory data specify the characteristics of a trajectory and allow to determine whether the trajectory corresponds to an intentional action of the driver, such as an intentional lane change, or to an anomalous trajectory.

Further data, such as the recognition of an active indicator light can also be used to detect whether a lateral motion of the neighboring vehicle is intentional. If the neighboring vehicle turns without prior indication there is a higher likelihood of an anomalous trajectory or, conversely, if it turns with indication the lateral motion is likely an intentional motion.

It is determined, based on the comparison, if the trajectory of the neighboring vehicle is an anomalous trajectory. If it is detected that the trajectory is an anomalous trajectory, an alert signal is output, if it is determined that the trajectory of the neighboring vehicle is an anomalous trajectory. For example, the alert signal can be provided by one or more data packet which are sent via a data bus. The data packets can comprises further information about the nature or the criticality of the anomalous trajectory.

The abovementioned method applies in particular if both the present vehicle and the neighboring vehicle are moving in a forward direction relative to the street surface. Furthermore, the method works particularly well if the road is straight but it can also be used in curves. Similarly, the motion of the present vehicle is especially suitable as reference trajectory, if it is approximately straight, but a curved trajectory may be used as well.

According to one embodiment, the predetermined trajectory data includes a deviation to the left or to the right with respect to the reference trajectory. For example, if the neighboring vehicle crosses a lane marker at the outer boundary of a road and does not slow down or flash the warning lights this already indicates that the trajectory is an anomalous trajectory.

Furthermore, the predetermined trajectory data may include a deviation pattern with respect to a reference trajectory. For example, the deviation pattern may specify lateral deviations. In a specific embodiment, the deviation pattern is a deviation time sequence with respect to a reference trajectory, in particular with respect to lateral deviations relative to the reference trajectory. By way of example, an anomalous trajectory can be detected if the deviation time sequence corresponds to a pre-determined deviation time sequence of an anomalous trajectory.

In one embodiment, a comparison of the trajectory of the neighboring vehicle with a deviation pattern that specifies an anomalous trajectory includes computation of a distance measure between the anomalous trajectory and the trajectory of the neighboring vehicle. The distance measure indicates a likelihood that the detected trajectory of the neighboring vehicle corresponds to an anomalous trajectory. In particular, the comparison may include comparing the distance measure with a predetermined threshold.

According to one specific embodiment, the deviation pattern includes a first lateral deviation in a first direction and a subsequent second lateral deviation in a second direction, wherein the second direction is opposite to the first direction. Thereby, an unintentional driving may be differentiated from an intentional turn, in particular if the first lateral deviation is directed towards a neighboring lane and not towards the road boundary.

In a further embodiment, the deviation pattern includes two or more lateral deviations or turns in alternate directions, which are similar in duration and shape, also known as "sinuous line" or "wiggly line". This type of deviation pattern may occur under an influence of drugs or medication.

In a further embodiment, the deviation pattern specifies that a duration of the second lateral deviation is shorter than a duration of the first lateral deviation. Such a feature may be caused by a correction movement to the first deviation, especially in a situation in which the driver of the neighboring vehicle has dozed off and suddenly wakes up again.

Furthermore, the trajectory may be compared against a plurality of deviation patterns, which specify different kinds of anomalous trajectories. In a further embodiment, the deviation patterns depend on the motion state of the neighboring vehicle, and in particular on its speed.

According to one embodiment, the reference trajectory is derived from an image frame sequence of at least one lane marker, provided that the lane marker is present and suitable for providing a reference trajectory or a relative motion with respect to the reference trajectory. According to a further embodiment, the reference trajectory is derived from motion sensor data of the present vehicle, such as speed and steering angle sensors.

According to further embodiments, the method includes triggering an alert action if it is determined that the trajectory of the neighboring vehicle is an anomalous trajectory. In particular, the alert action may comprise slowing down the present vehicle, displaying an alert message on the instrument cluster of the present vehicle, sounding an alert signal inside the present vehicle, flashing the front lights of the present vehicle, sounding the horn of the present vehicle, sending a radio message via a radio transmitter of the present vehicle, or forwarding the warning message to a collision warning system.

Furthermore, the present specification discloses a computer executable program code for executing the abovementioned method and a computer readable memory including the computer executable program code.

In a further aspect, the present specification discloses an image processing unit for a vehicle. The image processing unit comprises an input connection for receiving image data from a vehicle camera and a computation unit. The computation unit may be provided by an integrated circuit, an ASIC, a microprocessor or similar devices.

The computation unit is operative to perform the steps of the abovementioned method, for example by comprising a computer readable memory with computer readable instructions for executing the abovementioned method.

In particular, the computation unit is operative to receive image data with image frames from the vehicle camera, to scan the image data for lane markings and lane boundaries, and to determine, if lane markings are detected in the image frames, if the detected lane markings are suitable for deriving a trajectory of the neighboring vehicle relative to the lane markings. In particular, this is the case when the lane marking are suitable to determine a reference trajectory.

Furthermore the computation unit is operative to derive a reference trajectory from the detected lane markers, if it is determined that the detected lane markings are suitable for determining or establishing the reference trajectory. Moreover, the computation is operative to derive a reference trajectory from motion data of the present vehicle.

The computation unit is furthermore operative to determine a trajectory of the neighboring vehicles relative to the reference trajectory, to derive characteristic parameters of the determined trajectory, and to compare the characteristic parameters with predetermined trajectory data. The computation unit determines, based on the comparison of the characteristic parameters with the predetermined trajectory data, if the trajectory of the neighboring vehicle is an anomalous trajectory.

If the trajectory is an anomalous trajectory, the computation unit outputs an alert signal, for example in the form of an electric signal that indicates an alert condition. In particular, the electric signal may be a digital signal that comprises one or more data packets.

Furthermore, the present specification discloses a kit with a vehicle camera and the aforementioned image processing unit, wherein the vehicle camera is connectable to the image processing unit. Among others, the image processing unit may be provided by a component of an electronic system of the car or it may be provided within the vehicle camera.

Furthermore, the present specification discloses a vehicle with the aforementioned kit. The vehicle camera is mounted to the vehicle such that it points to the exterior of the vehicle, and the processing unit is connected to the vehicle camera. It can be directly connected via a cable or in-directly via an automotive data bus, such as CAN, LIN, Flexray, or MOST.

The predetermined trajectory data can be provided in various ways. For example it can be trained to a neural network implementation or it can be provided as values or value ranges. The computation unit may also comprise a fuzzy logic algorithm, which takes into account the overlap between the determined trajectory with anomalous or with normal trajectories.

In one exemplary embodiment, a method for detecting and considering an irregular driving behavior of a target vehicle includes identifying lane boundaries utilizing at least one environment-detecting sensor of an ego-vehicle and/or obtaining the lane boundaries from a highly accurate map. The method also includes allocating the lane boundaries to a position of the target vehicle from the identification of the target vehicle by the at least one environment detecting sensor of the ego-vehicle. The method further includes establishing whether an irregular driving behavior of the target vehicle exists, wherein the irregular driving behavior is derived from a behavior of the target vehicle within the lane boundaries and/or the individual speed of the target vehicle and/or an acceleration and/or deceleration and/or an unnatural driving maneuver of the target vehicle. After establishing an irregular driving behavior, at least one driving parameter of the ego-vehicle is adapted in an anticipatory manner in order to reduce a potential danger with the target vehicle.

In connection with this, an environment detecting sensor may be a camera system, a lidar sensor system, or a radar sensor system. A combination of two or all three of these environment detecting sensors may also be used.

In this case, the term 'lane boundaries' describes lane boundary lines or also elevated boundaries such as, for example, guardrails, peripheral developments or construction site demarcations. Both the lane boundary lines and the previously indicated elevated lane boundaries and, consequently, also the course of a lane can be identified by means of a lidar sensor system or a camera system. The elevated lane boundaries can be identified by means of a radar sensor system and, consequently, the course of a lane can at least be estimated and, accordingly, an irregular driving behavior of the target vehicle can also be identified by means of radar.

Cumulatively or alternatively to the identification of the target vehicle utilizing a radar sensor system and/or a camera system and/or lidar sensor system of the ego-vehicle, it would also be possible for the target vehicle to independently pass on information regarding the position and/or the driven trajectory to the ego-vehicle by means of vehicle-vehicle communication. Consequently, the ego-vehicle would establish on the basis of the received information whether an irregular driving behavior exists.

In this case, a potential danger can, for example, be an unexpected emergency braking of the target vehicle to a standstill, a collision with another road user or with a lane boundary or the like.

Here, the conduct within the lane includes whether the target vehicle has a constant trajectory within the lane boundaries, or whether lateral deviations can be identified. This means that it is established at least one of the sensors whether the target vehicle is swerving about within the lane boundaries or crossing the lane boundaries multiple times one after another. If such conduct is detected, the driving behavior of the target vehicle is classified as irregular. Here, a constant trajectory describes a trajectory which runs centrally within two lane boundaries. A constant trajectory can alternatively also exist if the target vehicle is moving on the basis of a reference trajectory, as a result of which, in the event of deviations from the center of the lane due to the lane narrowing and/or obstacles, it is not concluded that the driving behavior of the target vehicle is irregular.

Alternatively or cumulatively, in order to determine the irregular driving behavior, the individual speed of the target vehicle it can also be monitored checked and it can, accordingly, be established whether the target vehicle is driving more slowly or more quickly than permitted without an obvious reason such as, for example, dense traffic or bad weather conditions such as ice, fog or the like. The maximum speeds or respectively typical speeds can be stored in a map. Dense traffic can be ascertained by means of onboard sensor technology or online traffic information. Icy conditions can be ascertained by means of online weather information or by an onboard temperature and rain sensor or by means of onboard roadway condition detection.

In this case, the target vehicle can be a manually controlled vehicle which is controlled by an impaired driver. The driver of this vehicle can be impaired, for example, by alcohol, tiredness or other influences. The target vehicle can, admittedly, also be an automated vehicle with a malfunction, wherein, in this case, one or more sensors are, for example, disrupted, which can result in an irregular driving behavior.

The danger zone describes the environment of the target vehicle and extends, for example, to the neighboring lanes respectively and a rear area behind the target vehicle. The dimensions in the rear area of the target vehicle can, for example, be specified by the minimum safety distance of the ego-vehicle from the target vehicle. The minimum safety distance is dependent on the current speed of the ego-vehicle and can be independently adjusted and observed by the ego-vehicle. Consequently, the distance between the ego-vehicle and the target vehicle would be completely classified as the danger zone. The lateral boundaries of the danger zone can, for example, be specified by the field of view of a front camera and/or by the detection range of a lidar sensor and/or a radar sensor.

In one exemplary embodiment, the adaptation of a driving parameter includes the adaptation of the speed of the ego-vehicle and/or the adaptation of a lateral and/or longitudinal distance from the target vehicle. Such an adaptation is advantageous in order to reduce the potential danger, since, for example, due to a lower speed and/or an increased distance, more time remains to take evasive action and/or brake before an immediate risk of collision exists and an emergency braking maneuver of the ego-vehicle would have to be performed. The longitudinal distance is preferably increased by the reduction in the speed. Increasing the lateral distance is, for example, possible on a three-lane road.

If the target vehicle is located in the outermost right lane, it is possible, for example, to change to the outermost left lane.

In addition, all of the additional road users located in the danger zone may be classified as potentially unsafe. This means that it is assumed that these additional road users can likewise potentially have an irregular driving behavior. In such a scenario, the safety distance from the target vehicle and an additional road user is increased, in order to be able to take evasive action or brake, for example, in the event of a collision of the target vehicle with the additional road user.

The ego-vehicle is may be operated in a fully automated manner or in a partially automated manner. This means that the ego-vehicle is equipped with appropriate control and computing units which are configured to control the vehicle situationally without the participation of the driver. In an emergency such as, for example, the failure of a sensor, it may nevertheless be possible for the driver to take over control of the ego-vehicle.

In another exemplary embodiment, a trajectory of the ego-vehicle is planned in order to avoid a collision with the target vehicle, in order to shield the danger zone or in order to leave the danger zone. In order to shield the danger zone, the ego-vehicle can, for example, align itself centrally between two lanes so that a following vehicle cannot enter the danger zone. Alternatively, the ego-vehicle can orient itself towards an emergency lane, in order be able to take evasive action more quickly in the event of the target vehicle braking suddenly. Furthermore, it would be possible, for example in the case of a three-lane highway, to overtake the target vehicle using the outermost left lane if the target vehicle is located in the outermost right lane, provided that no additional road user is located in the middle lane and, consequently, a sufficient lateral safety distance is provided between the ego-vehicle and the target vehicle.

During the planning of the trajectory, the speed of the target vehicle, the width of the roadway, the number of lanes on the roadway and the number of additional road users may be considered.

In one exemplary configuration, after establishing the irregular driving behavior of the target vehicle, a piece of information is output to additional road users and/or the surrounding infrastructure. A simple form of outputting a warning to additional road users would be activating the hazard lights. Alternatively, the location of the target vehicle or information regarding the danger zone can also, for example, be transmitted by means of vehicle-to-vehicle communication to following vehicles. Furthermore, it would be possible to pass on the information regarding the target vehicle by means of vehicle-to-X communication to the adjacent infrastructure in order, for example, to output a warning to other road users on display boards on highways or to regulate the maximum permitted speed by means of the display boards, which maximum permitted speed corresponds to the speed of the ego-vehicle, so that following vehicles reduce their speed in good time and thus do not enter the vicinity of the danger area.

Furthermore, a system for carrying out the proposed method may be implemented. The system may include at least one lidar sensor and/or a camera and/or a radar sensor as well as a computing unit for evaluating the sensor data, in order to detect lane boundaries and/or a target vehicle and in order to plan a trajectory of the ego-vehicle. The system may also include a control unit, in order to adapt at least one driving parameter of the ego-vehicle.

BRIEF DESCRIPTION OF THE DRAWINGS

The subject matter of the present specification is now explained in further detail with respect to the following Figures in which:

FIG. 3 shows an anomalous trajectory of a preceding vehicle in front of a present vehicle on a road with no markers or with unrecognizable markers according to one exemplary embodiment;

FIG. 4 shows vehicle trajectories on a road without markings for the traffic lanes, wherein a preceding vehicle has an anomalous trajectory and a vehicle in behind has a similar trajectory to the present vehicle according to one exemplary embodiment;

DETAILED DESCRIPTION

In the following description, details are provided to describe the embodiments of the present specification. It shall be apparent to one skilled in the art, however, that the embodiments may be practiced without such details.

Figure 1:
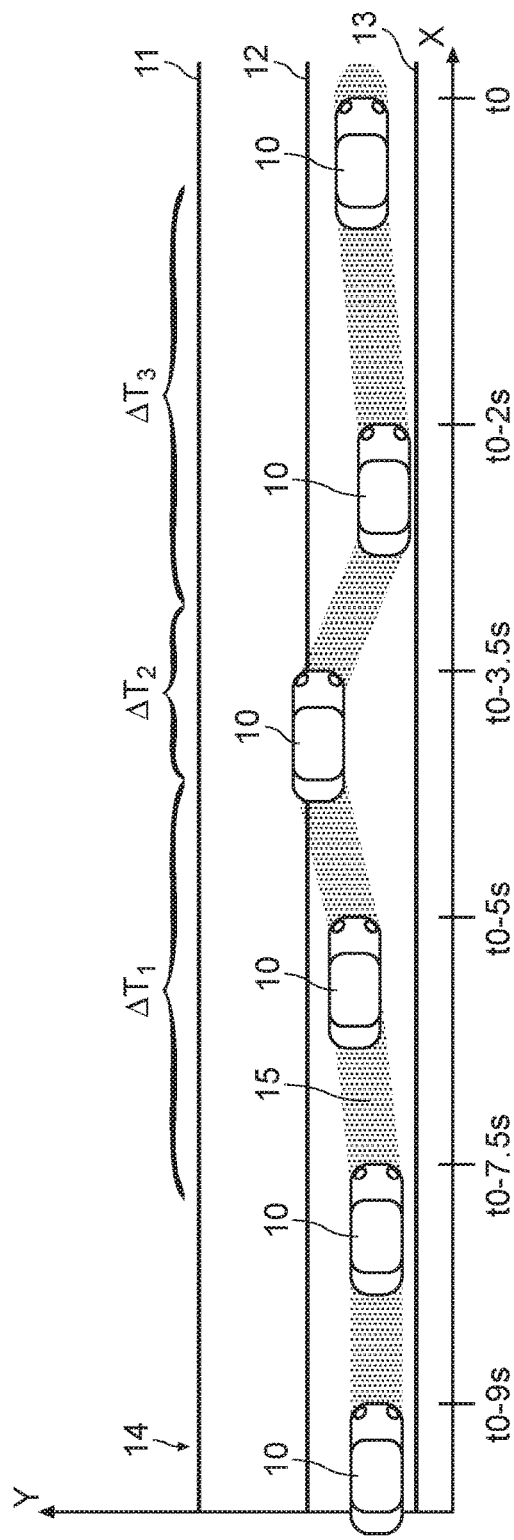
FIG. 1 shows an anomalous vehicle trajectory on a road with markings for the traffic lanes according to one exemplary embodiment.

FIG. 1 shows an example of an anomalous trajectory 15 of a vehicle 10 on a road 14, which has markings 11, 12, 13 for traffic lanes. The markings include a left marking 11, a middle marking 12 and a right marking 13. The directions "right" and "left" refer to the heading of the vehicle 10.

At a first time t0—8 s and at a second time t0—7.5 s the vehicle 10 is still traveling in parallel to a left marker and to a right marker of the traffic lane, wherein "s" stands for seconds. At a time t0—5 s the vehicle is travelling to the left of its previous position and at a later time to—3.5 the vehicle has crossed the left marker of the right lane and is slightly overlapping with the left lane.

At a later time to—2 s the vehicle has travelled back do the right lane but is now slightly overshooting to the right with respect to its first position. At a time t0 the vehicle travels in a straight line again but now it is slightly offset to the left with respect to its first position.

The behavior of the vehicle 10 is also characterized by different driving phases, such as a deviation phase $\Delta T1$, a correction phase $\Delta T2$, and a compensating oscillation phase $\Delta T3$. In the example of FIG. 1, the deviation phase $\Delta T1$ of the vehicle 10 to the left took about 2.5 s, the correction phase $\Delta T2$ and the compensating oscillation phase of the vehicle took about 2 s.

Figure 2:
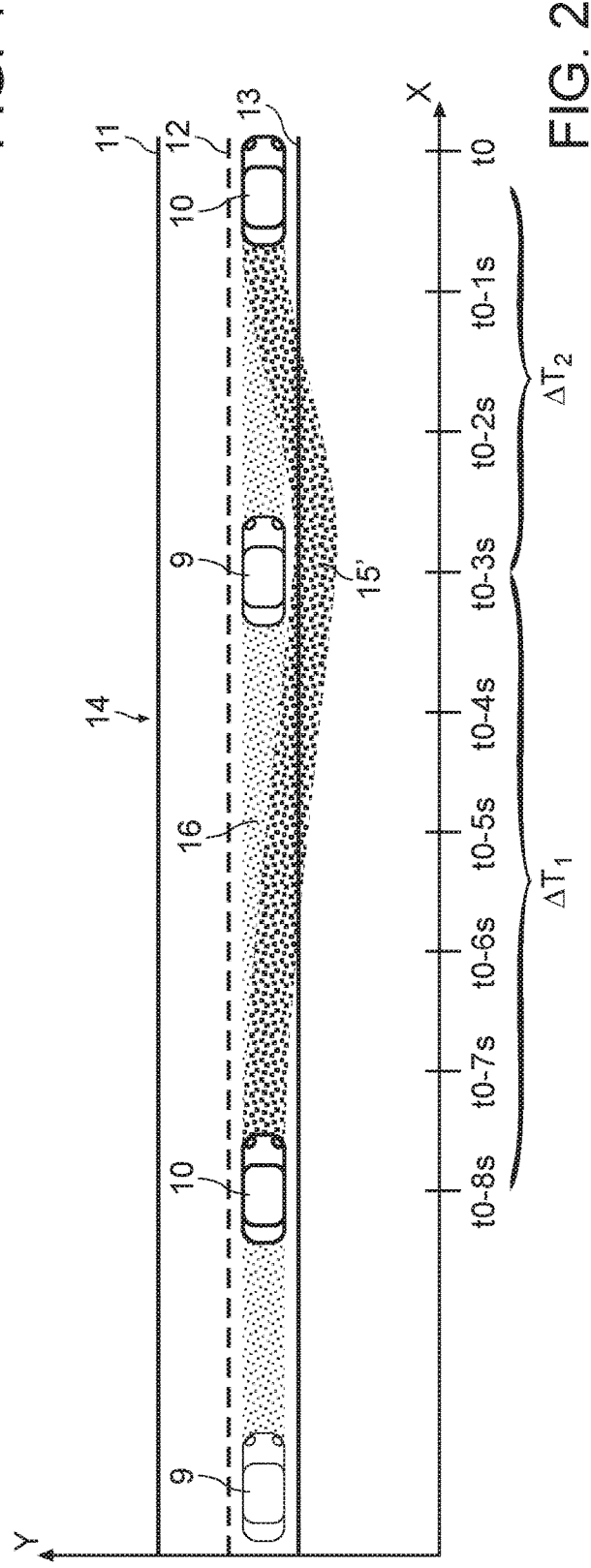
FIG. 2 shows an anomalous trajectory of a preceding vehicle in front of a present vehicle on the road of FIG. 1.

FIG. 2 shows a second example of an anomalous trajectory 15' of a preceding vehicle 10 on a road 14, which has markings 11, 12, 13 for traffic lanes. The preceding vehicle 10 is driving in front of a present vehicle 9, which is driving on a straight trajectory 16. According to one method of the present specification, the anomalous trajectory 15' is detected by using the reference provided by the traffic lanes 11, 12, 13. The reference markers are detected by using image data or data from other imaging or distance sensors such as radar and lidar.

In the example of FIG. 2, the preceding vehicle 10 deviates slowly to the right, which takes about 7 seconds in total. A drifting off to the right takes about 5 seconds and a corrective movement to the left takes about 3 seconds. This time, there are no subsequent oscillations after the vehicle has come back to its previous position. Hence, there is a deviation phase of about 5 seconds and a correction phase of about 3 seconds.

In the example of FIG. 2, the preceding vehicle 10 already leaves the lane, drives on the marginal strip and is coming dangerously close to veering off the road. This is a further indicator of an unintended motion. Sometimes, the marginal strip has a rough material or loose chippings and this might also affect the reactions of the preceding driver 10.

The distances and relative velocities of the vehicle in front at the times t0—8 s, t0—7 s, t0—6 s, t0—5 s, t0—4 s, t0—3 s, t0—2 s, t0—1 s, t0 with respect to the present vehicle are summarized in the following Table 1:

| Time | Distance | Relative transverse speed $\Delta Vy$ |
| --- | --- | --- |
| t0-8 s | 0.1 m | −0.1 m/s |
| t0-7 s | 0.3 m | −0.2 m/s |
| t0-6 s | 0.55 m | −0.25 m/s |
| t0-5 s | 0.85 m | −0.3 m/s |
| t0-4 s | 1.2 m | −0.35 m/s |
| t0-3 s | 1.3 m | −0.1 m/s |
| t0-2 s | 1.1 m | 0.3 m/s |
| t0-1 s | 0.4 m | 0.7 m/s |
| t0 | 0 m | 0.4 m/s |

FIG. 3 shows a present vehicle 9 and a preceding vehicle 10 which are travelling on the same trajectories as shown in FIG. 2. Different from FIG. 3, there are no road markings, or at least the road marking are not sufficiently clear for determining a trajectory of the preceding vehicle 10.

FIG. 4 shows a present vehicle 9 and a preceding vehicle 10 on a road 14', which are moving on the same trajectories as shown in FIG. 3. Furthermore, FIG. 4 shows a following or trailing vehicle 8, which travels behind the present vehicle 9 in a similar trajectory as the present vehicle 9. For simplicity, the trajectory of the following vehicle 8 is not shown in detail.

Figure 5:
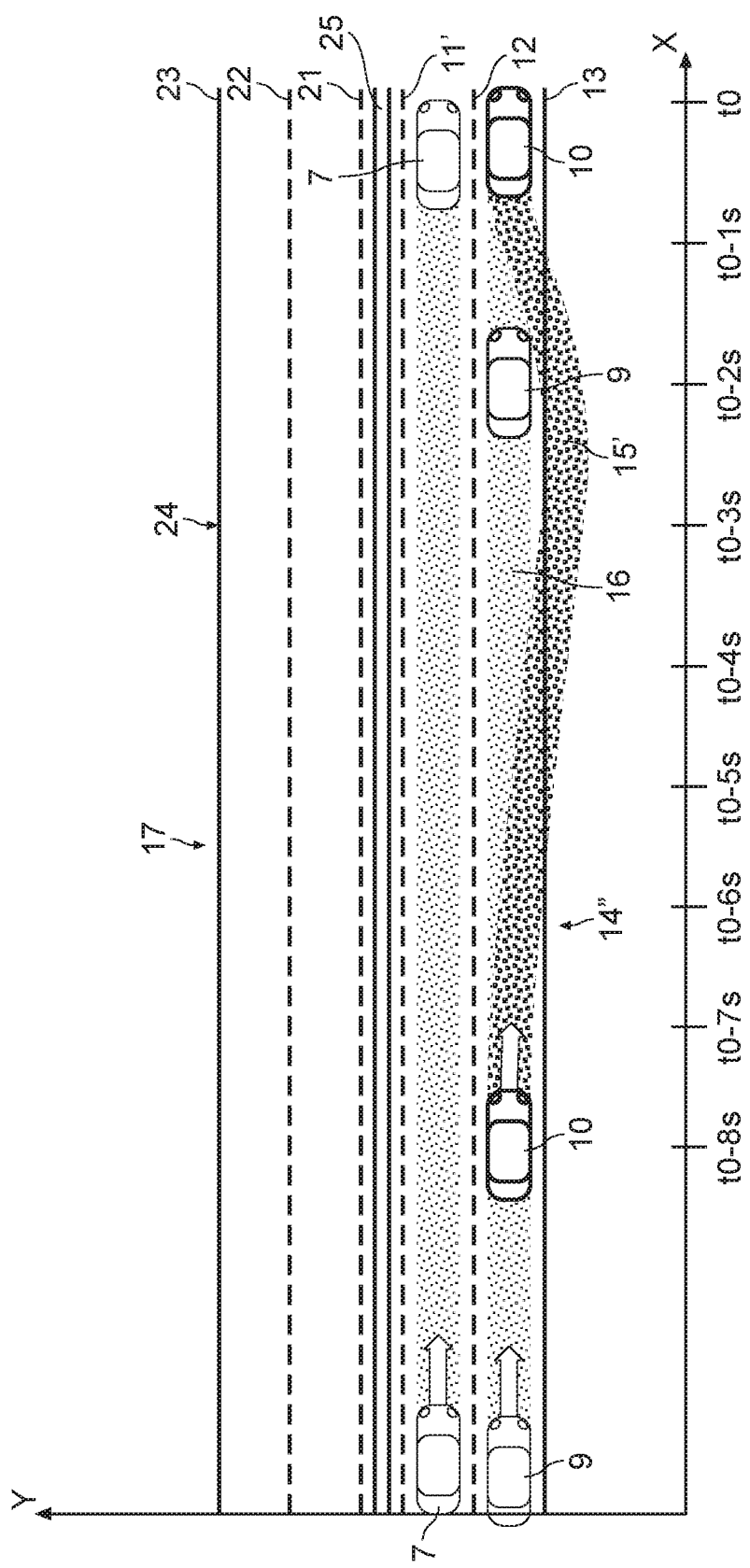
FIG. 5 shows vehicle trajectories on a highway with two traffic lanes in one direction, wherein a preceding vehicle has an anomalous trajectory and a vehicle on the left traffic lane has normal trajectory according to one exemplary embodiment.
Figure 6:
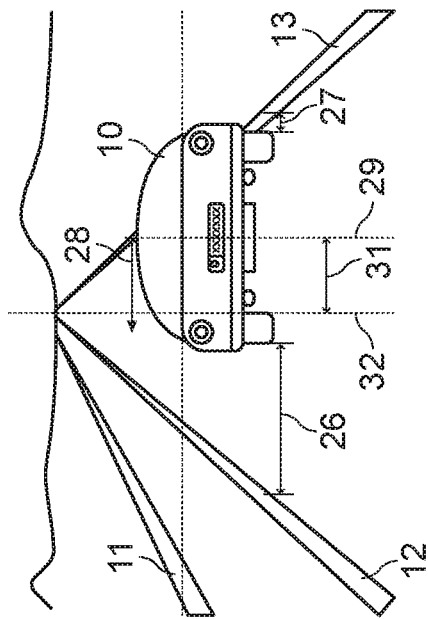
FIG. 6 shows a rear view of the vehicle in front of FIG. 2 at a time t0 that is captured by a mono camera of the present vehicle.
Figure 8:
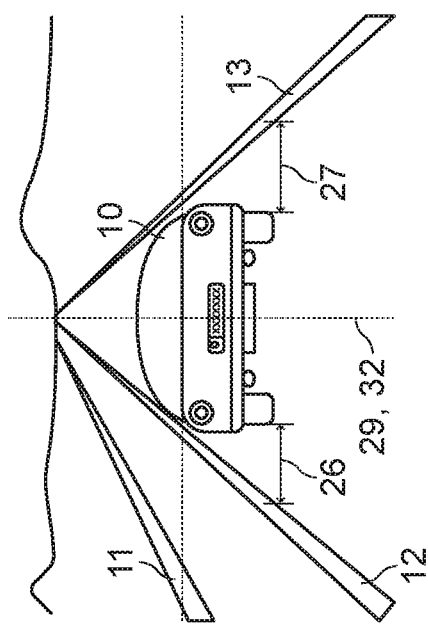
FIG. 8 shows a rear view of the preceding vehicle of FIG. 2 at a time t0—2 s.
Figure 7:
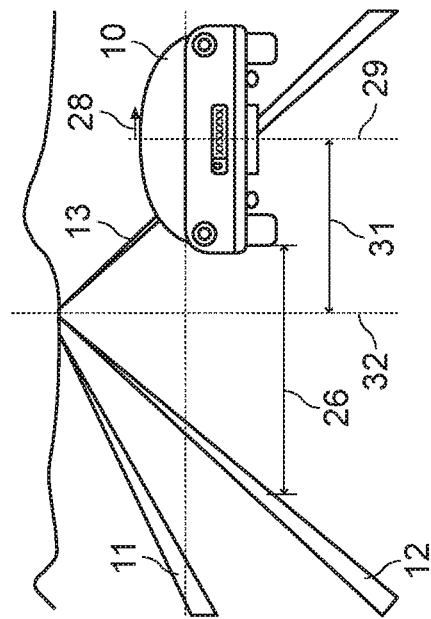
FIG. 7 shows a rear view of the preceding vehicle of FIG. 2 at a time t0—1 s.
Figure 9:
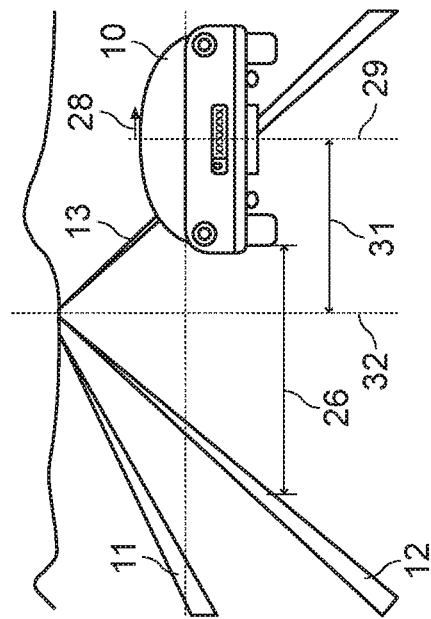
FIG. 9 shows a rear view of the preceding vehicle of FIG. 2 at a time t0—3 s.
Figure 10:
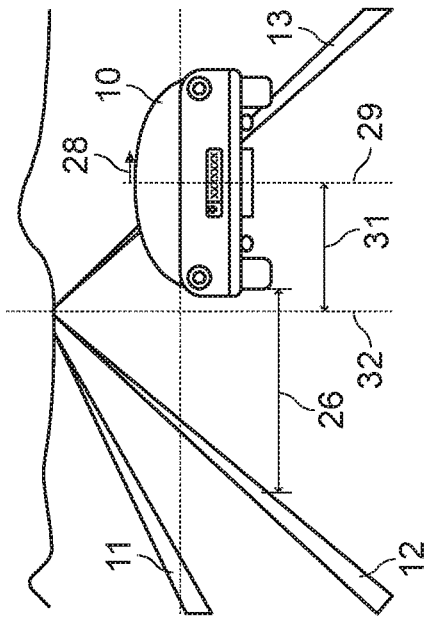
FIG. 10 shows a rear view of the preceding vehicle of FIG. 2 at a time t0—4 s.
Figure 11:
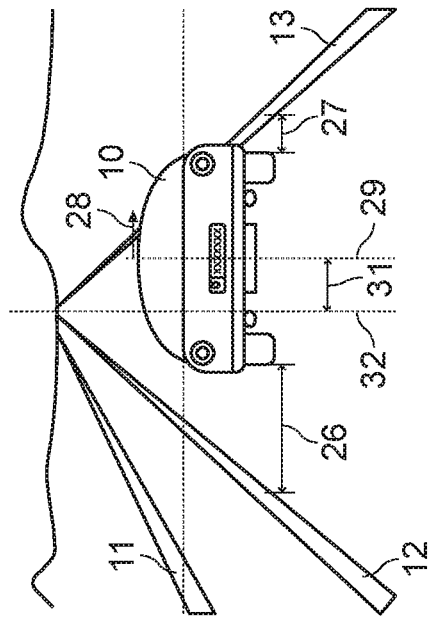
FIG. 11 shows a rear view of the preceding vehicle of FIG. 2 at a time t0—5 s.
Figure 12:
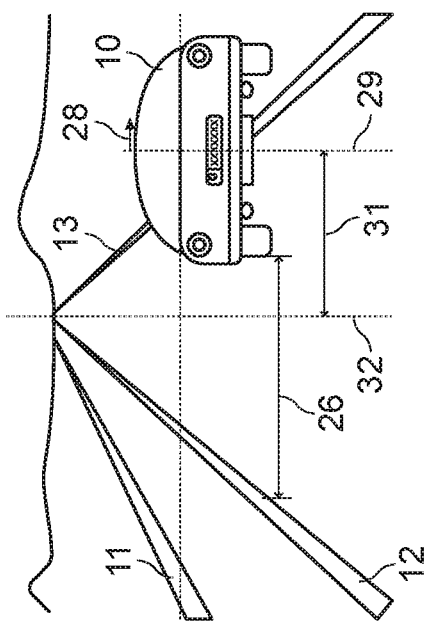
FIG. 12 shows a rear view of the preceding vehicle of FIG. 2 at a time t0—6 s.
Figure 13:
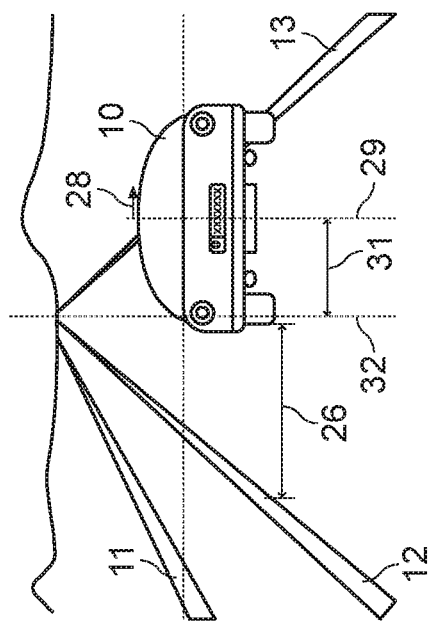
FIG. 13 shows a rear view of the preceding vehicle of FIG. 2 at a time t0—7 s.
Figure 14:
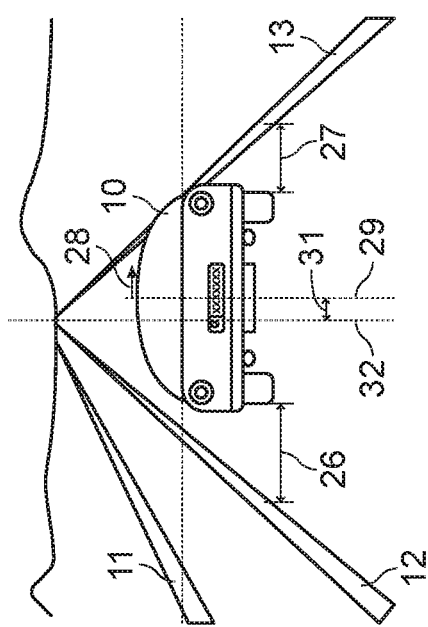
FIG. 14 shows a rear view of the preceding vehicle of FIG. 2 at a time t0—8 s.
Figure 16:
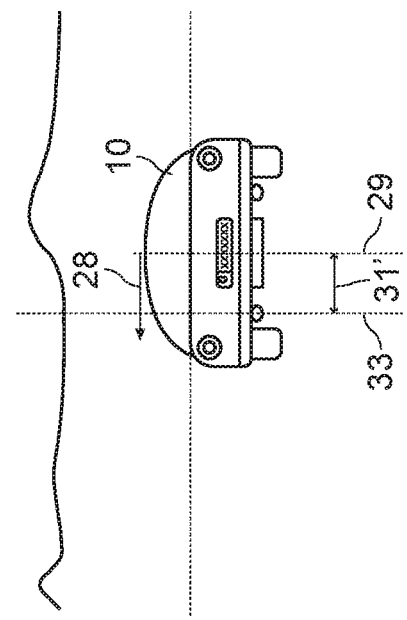
FIG. 16 shows a rear view of the preceding vehicle of FIG. 3 at a time t0—1 s.
Figure 15:
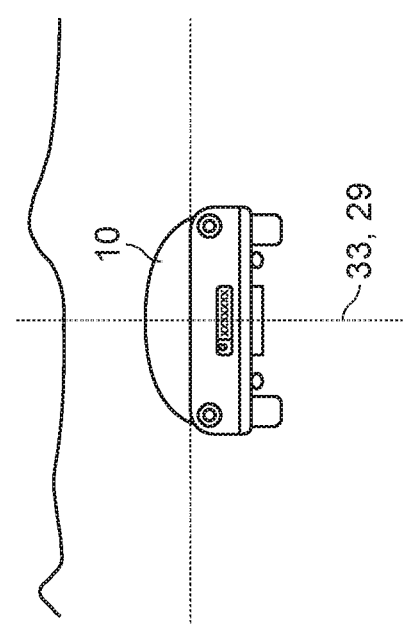
FIG. 15 shows a rear view of the preceding vehicle of FIG. 3 at a time t0 that is captured by a mono camera of the present vehicle.
Figure 17:
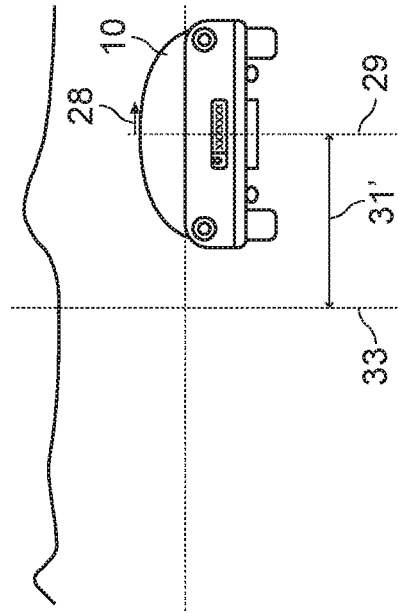
FIG. 17 shows a rear view of the preceding vehicle of FIG. 3 at a time t0—2 s.
Figure 18:
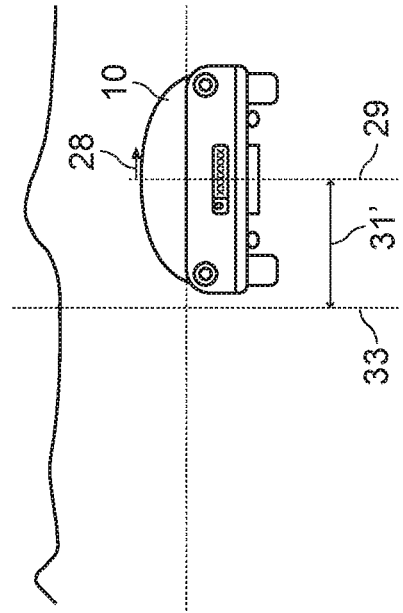
FIG. 18 shows a rear view of the preceding vehicle of FIG. 3 at a time t0—3 s.
Figure 19:
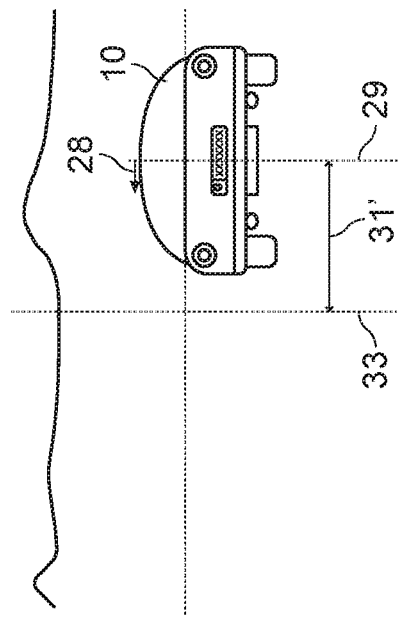
FIG. 19 shows a rear view of the preceding vehicle of FIG. 3 at a time t0—4 s.
Figure 20:
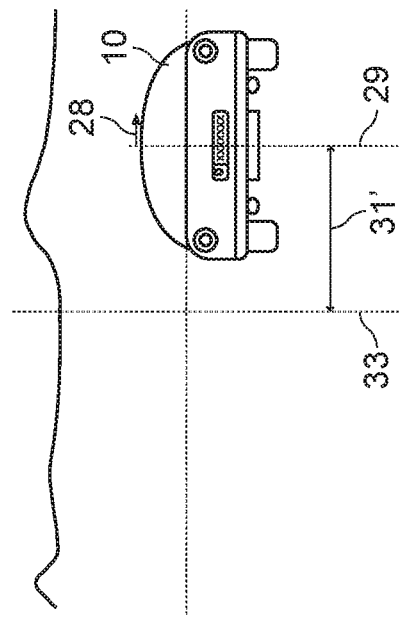
FIG. 20 shows a rear view of the preceding vehicle of FIG. 3 at a time t0—5 s.
Figure 21:
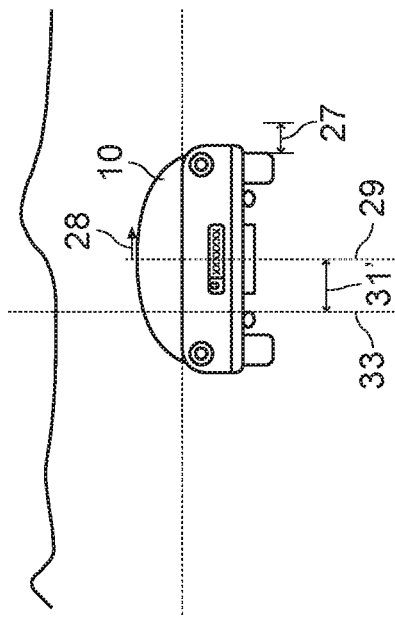
FIG. 21 shows a rear view of the preceding vehicle of FIG. 3 at a time t0—6 s.
Figure 22:
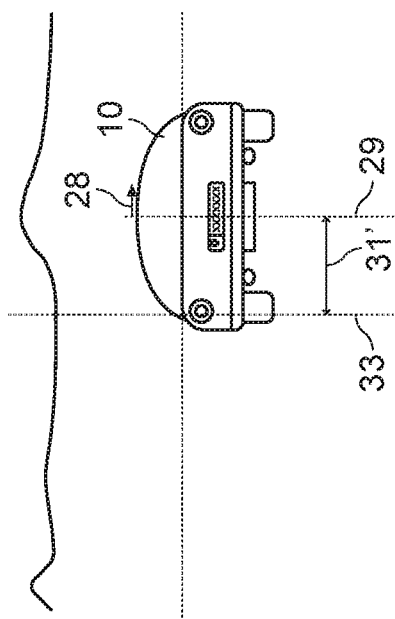
FIG. 22 shows a rear view of the preceding vehicle of FIG. 3 at a time t0—7 s.
Figure 23:
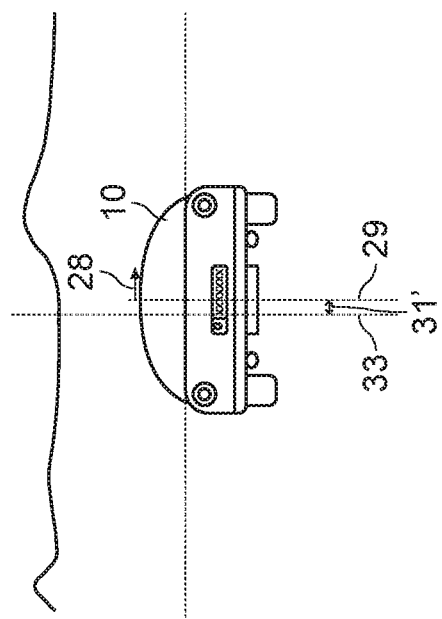
FIG. 23 shows a rear view of the preceding vehicle of FIG. 3 at a time t0—8 s.
Figure 24:
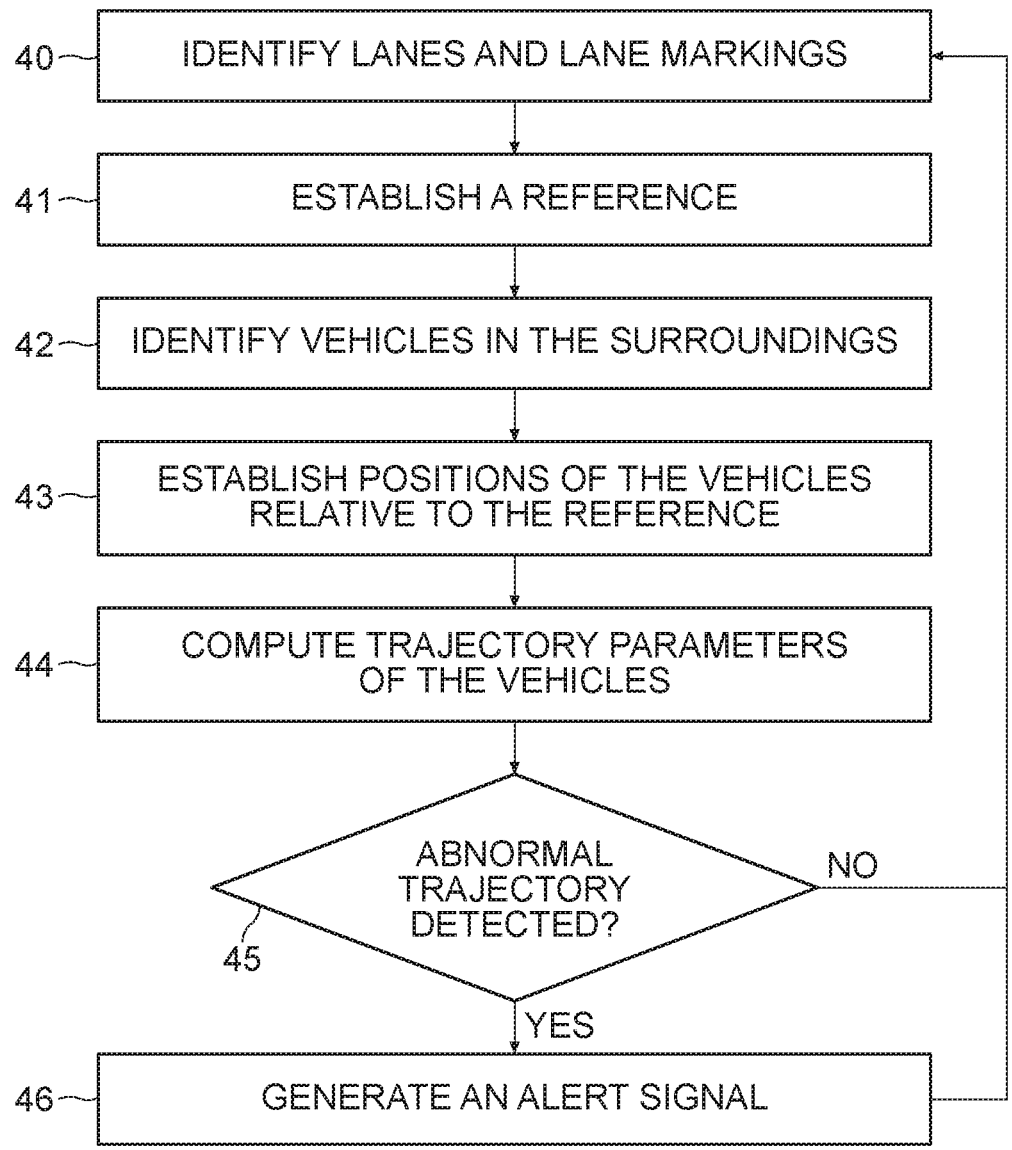
FIG. 24 shows a flow diagram of a first method for determining an anomalous vehicle trajectory.
Figure 25:
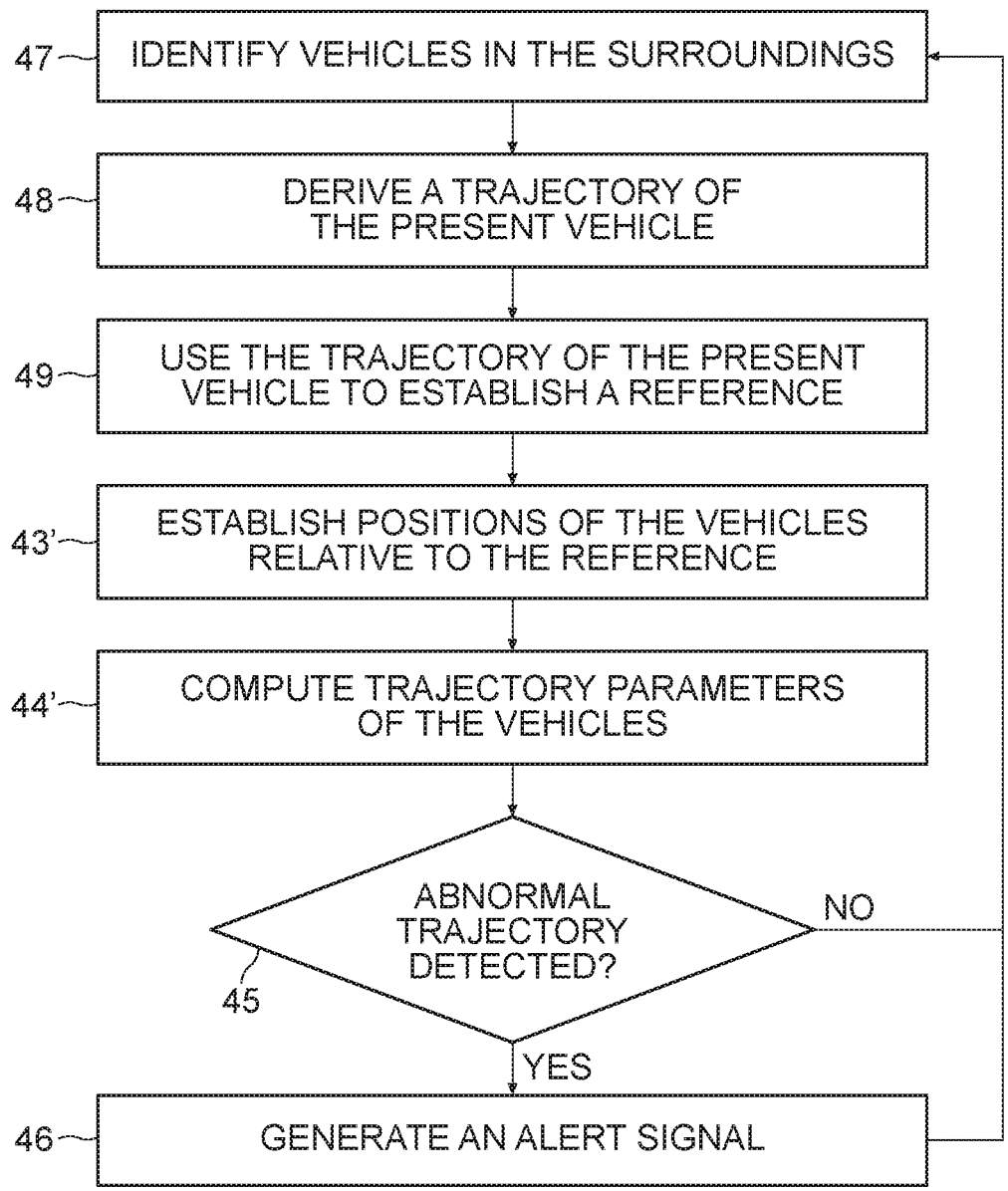
FIG. 25 shows a flow diagram of a second method for determining an anomalous vehicle trajectory.

FIG. 5 shows a present vehicle 9, a preceding vehicle 10 and a left side vehicle 7 on a double road 17 with a first track 14" and a second track 24, which are separated by a median strip 25.

The preceding vehicle 10 and the present vehicle 9 are moving on the same trajectories as shown in FIG. 3 and in Table 1. The left side vehicle 7 is traveling alongside the present vehicle 9 and is only slightly changing its relative movement. These slight changes can be summarized by the following Table 2:

| Time | Lateral deviation | Relative transverse speed $\Delta Vy$ |
| --- | --- | --- |
| t0-8 s | 0.3 m | 0.1 m/s |
| t0-7 s | 0.4 m | 0.1 m/s |

-continued

| Time | Lateral deviation | Relative transverse speed ΔVy |
|---|---|---|
| t0-6 s | 0.5 m | 0.1 m/s |
| t0-5 s | 0.5 m | 0.05 m/s |
| t0-4 s | 0.55 m | 0 m/s |
| t0-3 s | 0.45 m | −0.1 m/s |
| t0-2 s | 0.35 m | 0.1 m/s |
| t0-1 s | 0.25 m | 0.1 m/s |
| t0 | 0.15 m | −0.1 m/s |

In the examples of FIGS. 1, 2, and 5, the relative transverse speed is determined with respect to the markers, whereas in the examples of FIGS. 3 and 4 it is determined with respect to a trajectory of the present vehicle 9.

The trajectory of the present vehicle 9 can be determined by using the signals of steering angle and speed sensors of the present vehicle and/or by using an ego-motion calculation of a camera system of the present vehicle 9 or also by using a GPS system of the present vehicle 9.

FIGS. 6 to 14 show the motion of FIG. 2 of the preceding vehicle 10 from the perspective of a mono camera of the present vehicle 9. Distance markers 26, 27 indicate the respective distances from the lane markings to the lateral boundaries of the preceding vehicle. A velocity arrow 28 next to a vertical symmetry axis 29 of the preceding car 10 indicates the lateral speed of the preceding vehicle. Furthermore, a vertical line 30 indicates a distance 31 from the middle 32 of the lane to the vertical symmetry axis 29 of the preceding car 10.

The respective distances of the respective lateral boundaries of the preceding vehicle to the lane markings are calculated as in the following Table 3:

| Time | Distance to left lane marking | Distance to right lane marking |
|---|---|---|
| t0 | 55 cm | 55 cm |
| t0-1 s | 99 cm | 15 cm |
| t0-2 s | 175 cm | Not calculated |
| t0-3 s | 185 cm | Not calculated |
| t0-4 s | 175 cm | Not calculated |
| t0-5 s | 140 cm | Not calculated |
| t0-6 s | 110 cm | Not calculated |
| t0-7 s | 85 cm | 15 cm |
| t0-8 s | 65 cm | 45 cm |

In the embodiment of FIGS. 6 to 14, the distance of a lateral boundary of the preceding vehicle 10 to a lane marking 11, 12, 13 is not calculated if the respective boundary is outside the boundaries of the lanes. Especially when the lateral boundary is determined by a boundary of the tires, as in FIGS. 6 to 14, this distance is more difficult to calculate and may not be useful for improving the estimate. However, in other embodiments, the lateral distance may be calculated for this case as well.

FIGS. 15 to 23 show a preceding vehicle traveling on the trajectory of FIG. 3 from the perspective of a mono camera of the present vehicle 9. A distance marker 31' indicates a distance from a current heading 33 of the present vehicle 9 to a symmetry axis 29. More specifically, the vertical line 33 represents a projection of the current heading to the street surface.

The symmetry axis 29 can be determined, for example, by first determining the lateral boundaries of the preceding vehicle 10 and calculating a center point between the lateral boundaries.

A velocity arrow 28 next to a vertical symmetry axis of the preceding car 10 indicates the lateral speed of the preceding vehicle 10. Furthermore, a vertical line 33 indicates a distance from the current heading 33 to the lane to the vertical symmetry axis 29 of the preceding car 10.

For the purpose of illustration, FIGS. 2 to 23 refer to time slots of 1 second or 0.5 seconds. In an actual implementation, the time slots can be shorter or longer. For example, for a vehicle camera with 15 frames per second or 30 frames per second, the times slots can be as short as ⅟15 or ⅟30 of a second.

According to a first method, which is used when the markings of the traffic lanes can be identified by the ADAS camera sensors or other sensors in the vehicle. The markings are used as reference to establish whether a vehicle in the vicinity is drifting from its traffic lane in a hazardous way.

According to a second method, which is used when there are no markings or the when vehicle cannot identify the markings of the traffic lanes with sufficient accuracy. The own trajectory and, if possible, the additional trajectories of the other vehicles in the vicinity are used as reference to establish whether a vehicle is drifting from its traffic lane in a hazardous way.

The first method is now explained in further detail. In a first step 40, the system identifies the traffic lanes and markings of the traffic lanes.

In a step 41, the lanes are used to establish a reference. The reference could be for example the longitudinal axes of the traffic lane. Another way is to use one of the left or the right boundary lines of the traffic lane as reference.

For the lane in front of the vehicle, the lane detection can be done using existing ADAS Front camera sensors that are also used for a lane detection (LD) function.

For the rear side of the present vehicle, a rear view camera can be used. According to one embodiment, a computation unit of the rear view camera is operative to execute methods for detecting the traffic lines.

A surround view camera that is operative to execute method for line detection can also be used for detecting the lines of the left side traffic lane or right side traffic lane. The surround view can be used in place of a rear view camera.

In a second step 42, the system identifies the vehicles in the surrounding area of the present vehicle 9. This action is done based on the existing algorithms for object detection and object classification that are integrated in the ADAS sensors, such camera sensors, radar, lidar etc.

In a third step 43, the system establishes the actual precise position of the discovered vehicles within the vicinity relative to their traffic lanes or, in other words, relative to the reference that has been chosen based on the markings of the traffic lanes.

For example for the preceding vehicles the images from the front view camera can be used to calculate the lateral deviations relative to their references.

When the longitudinal distance between the present vehicle and the other neighboring vehicles is needed, it can be calculated using the images from the camera sensors but it can also be taken from ADAS Radar and Lidar sensors. The system records these parameters for further calculations.

In a fourth step 44, the system calculates several parameters for each vehicle within the vicinity like the transverse speed and the lateral deviation versus its reference and the trajectory that the vehicle has followed in a certain period of time until the present moment.

Additional parameters can be also used, such as: the longitudinal speed, the distance covered along the traffic lane from a previous calculation time step, etc. The speed values are calculated taking in consideration the successive positions of the vehicle.

In a fifth step 45, a decision is taken with respect to the trajectory for each vehicle within the surrounding area. The decision is used to establish if the vehicle has a normal or non-dangerous trajectory or if the vehicle is drifting on a hazardous trajectory. If an anomalous trajectory is detected, an alert signal is generated and output for further processing. The generated alert signal can also include a confidence value, which indicates a certainty that the trajectory is an anomalous trajectory, or a risk value, which indicates a risk caused by the anomalous trajectory.

For the decision, the system uses also additional information for each vehicle that is monitored. For example, the activation of the turn indicators or of the brake lamps, etc. Such information is taken in consideration for the decision whether the trajectory is a normal one or a hazardous one. Turning vehicle lights on or off or activation of the brakes, which is also indicated by the braking lights, indicates that the driver of the vehicle intends to drive the vehicle in that way.

A decision whether a vehicle trajectory is an anomalous trajectory can be derived in several ways.

One way is based on a comparison with a pattern of trajectories. A classification table can be used to this end. The classification table contains a number of pre-determined patterns of trajectories, which have been chosen based on the detailed studies of the vehicle dynamics in traffic. The table is specific for a given position of the vehicles relative to the present vehicle. The classification table contains normal trajectories and anomalous trajectories for the monitored vehicle, including the hazardous ones.

Another way to decide whether a vehicle moves normally along its traffic lane is based on the parameters of its trajectory, such as the transverse speed of the vehicle at successive moments in time in which the vehicle deviates from the ideal trajectory on the traffic lane without having the turn indicator activated.

the value of the lateral deviation from the reference.

the transverse speed of the vehicle when the driver corrects the trajectory versus the reference. When a driver suffers of fatigue and is close to fall asleep the vehicle deviates slowly from its trajectory from the traffic lane. When he realise the deviation, it is highly likely that he corrects the trajectory abruptly.

the number of deviations from the ideal trajectory in a certain time frame.

Very often, a sleepy driver causes the vehicle to deviate repetitively or repeatedly, not only once. Therefore, the number of deviations in a given time provides an indication for the nature of the observed vehicle trajectory.

According to a second method, which is used if the vehicle is not able to find useful markings on the traffic lines, the position of a close-by vehicle is determined with respect to the longitudinal axes of the trajectory of the present vehicle, which are used as a reference. The close-by or neighboring vehicle is situated within a surrounding area of the present vehicle.

If further data from imaging or distance sensors are available, this trajectory is confirmed by the trajectories of the other vehicles situated in the field of view of the sensors, such as camera, radar or lidar.

In a first step 47 of the second method, the system identifies the vehicles in the surrounding area of the vehicle. This action is similar to the second step 42 of the first method. In a step 48, the system derives a trajectory of the present vehicle 9. In a step 49, the system uses the derived trajectory of the present vehicle to establish a reference.

In a second step 43' of the second method, which is similar to the third step of the first method, the system establishes the actual precise position of the discovered vehicles within the vicinity relative to the longitudinal axis of the own vehicle. For example, for the preceding vehicles 10 the images from the front view camera can be used to calculate the lateral deviations relative to the reference.

If the longitudinal distance between the present vehicle 10 and the other neighboring vehicles is required, it can be calculated using the images from the camera sensors but it can also be taken from ADAS radar and lidar sensors. The system will record these parameters for further calculations.

A third step 44' of the second method is similar to the fourth step 44' of the first method. The system calculates several parameters for each vehicle within the vicinity of the present vehicle, such as the transverse speed or the lateral deviation versus the longitudinal axis of the present vehicle's trajectory. The system also calculates the trajectory that the vehicle has followed in a certain period of time until the present moment.

Additional parameters can be also be used, such as the longitudinal speed or the distance covered along the traffic lane from a previous calculation time step. The values for the lateral and longitudinal positions of the neighboring vehicles are determined relative to the longitudinal axis of the trajectory of the present vehicle.

The values for the transverse or longitudinal speeds are calculated taking into consideration the actual and the previous positions of the vehicles.

The fifth step 45 is a decision step, in which a decision is taken with respect to the nature of the trajectory for each vehicle within the surrounding area. In particular, the decision establishes if the vehicle has a normal or non-dangerous trajectory or, instead, if the vehicle is drifting on a hazardous trajectory.

Similar to the first method, the system can make use of additional information that is monitored for the vehicles. For example, the activation of the turning indicators or the brake lamps, etc.

If an anomalous trajectory is detected, an alert signal is generated in a step 46 and output for further processing.

Besides those described above, other techniques for determining lane markings and/or an anomalous trajectory of a neighboring vehicle may be utilized.

One technique utilizes sensing solely by one or more lidar sensors, i.e., without the use of optical cameras. For example, the one or more lidar sensors generate a 3D point cloud from which the lane markings and the position of the neighboring vehicle may be extracted.

Another technique obtains the lane markings utilizing mapping data. These lane marking may be associated with the position of the vehicle as determined from cameras, lidar sensors, radar sensors, and/or GPS coordinates.

Yet another technique utilizes vehicle-to-vehicle ("V2V"), vehicle-to-infrastructure ("V2I"), and/or vehicle-to-everything ("V2X") communication. For example, a neighboring vehicle with an anomalous trajectory may report such to other vehicles and/or to other communication systems, which then may report to the present vehicle 10. In another example, external sensors (e.g., traffic cameras) may detect the vehicle with the anomalous trajectory and report such to the present vehicle 10.

In some conditions, a sinuous (or curved) driving path and/or an atypical speed of a neighboring vehicle may not be indicative of an anomalous trajectory. Numerous conditions may account for sudden variations in speed and/or trajectory, besides unsafe driving. These conditions may include, but are certainly not limited to: heavy traffic, slippery road conditions (e.g., snow or ice), pot holes in the roadway, and the presence of animals in the roadway. Data indicative of these conditions may be utilized when determining whether or not a neighboring vehicle is driving unsafely. For instance, if a neighboring vehicle adjusts trajectory, and it is determined that the trajectory change was made to avoid a pot hole, the neighboring vehicle would typically not be considered to be driving unsafely.

The methods and systems described herein may be implemented in a vehicle configured for fully- or semi-autonomous driving, i.e., an ego-vehicle. That is, the ego-vehicle may avoid a possible hazardous situation and/or a collision in response to the detection of a neighboring vehicle driving unsafely, such as the neighboring vehicle having an anomalous trajectory.

In one embodiment, a lateral safety corridor of the ego-vehicle and/or the distance between the ego-vehicle and the neighboring vehicle may be increased in response to the detection of neighboring vehicle being driven unsafely. The lateral safety corridor may be considered as the lateral (i.e., side-to-side) distance between the ego-vehicle and the neighboring vehicle. As such, the method and/or system may increase the distance between the ego-vehicle and the neighboring vehicle when it is determined that the neighboring vehicle is being driven unsafely.

In some embodiments, the basis of the collision avoidance strategy is that increased dynamics and unpredictability of the driving maneuvers of the vehicle being driven unsafely are assumed for the trajectory planning of the ego-vehicle. These driving maneuvers may include, but are not limited to, unexpected/unwarranted steering movements, braking maneuvers, or propulsion maneuvers.

Indirect danger from third vehicles may also be taken into account, as a collision of one vehicle to another may cause a chain reaction. In one embodiment, all other vehicles that are located in a "danger zone" of the neighboring vehicle being driven unsafely may also be classified as potentially unsafe. As such, an ego-vehicle may adjust its trajectory around each potentially unsafe neighboring vehicle.

Other conditions may also be taken into account when determining what actions to take by the ego-vehicle when one or more neighboring vehicles are determined to be driving in an unsafe manner. First, vehicles behind the ego-vehicle should be taken into consideration. For example, if it is determined that the ego-vehicle should decelerate, i.e., slow down, it is important that other vehicles approaching from the rear also have sufficient time and space to brake. As such, the distance from following vehicles may be included in the calculations to avoid rear-end collisions.

Another condition to consider is which avoidance options are available. For example, if there are other travel lanes in which the ego-vehicle could move into, preferably if those other travel lanes are free from other vehicles, then it may be advantageous to move into another travel lane.

Another condition to consider is whether or not a safe trajectory past the neighboring vehicle driving in an unsafe manner may be achieved. Typically, this is achieved at low speeds or with an increased distance on a wide roadway.

Alternatively, and/or in addition to changing trajectory and/or speed of the ego-vehicle, other techniques may be applied in response to the determination of a neighboring vehicle driving in an unsafe manner. These techniques include, but are not limited to, activating hazard warning lights, issuing a V2X-message, and sending data regarding the neighboring vehicle to off-board computer system. As such, the information regarding the potentially unsafe vehicle may be passed on to others.

The following scenario is merely exemplary but may by helping in understanding operation of an embodiment of the system and/or method described above. In this scenario, an ego-vehicle is travelling in the right-hand lane of a dual carriage with a hard shoulder. A neighboring vehicle being driven unsafely is detected in the right-hand lane. Directly alongside the ego-vehicle, in the left-hand lane, a third vehicle is travelling.

Initially, the third vehicle is also classified as unsafe. The hazard warning lights of the ego-vehicle may be activated. Then, the distance between the ego-vehicle and neighboring vehicle is increased. The hard shoulder offers a potential avoidance option if necessary to stop the ego-vehicle in case the neighboring vehicle should suddenly apply full braking, collide with another vehicle, and/or skid. Utilizing the hard shoulder, along with the hazard warning lights, is intended to prevent other vehicles approaching from behind to moving into the danger area.

The ego-vehicle may direct itself to the hard shoulder or to the center of the road, depending in the situation. The vehicle may also carefully overtake the unsafe neighboring vehicle in the left-hand lane and thus remove itself from the danger area.

As another option, the ego-vehicle may remain behind the unsafe neighboring vehicle until that vehicle drives onto the hard shoulder, slows down, or leaves the dual carriage way.

It should be understood that due to the numerous different possibilities, one set process may not be established. As such, the system and method are flexible to parameterize the possible driving strategies, rather than replace them with a fixed strategy.

Figure 26:
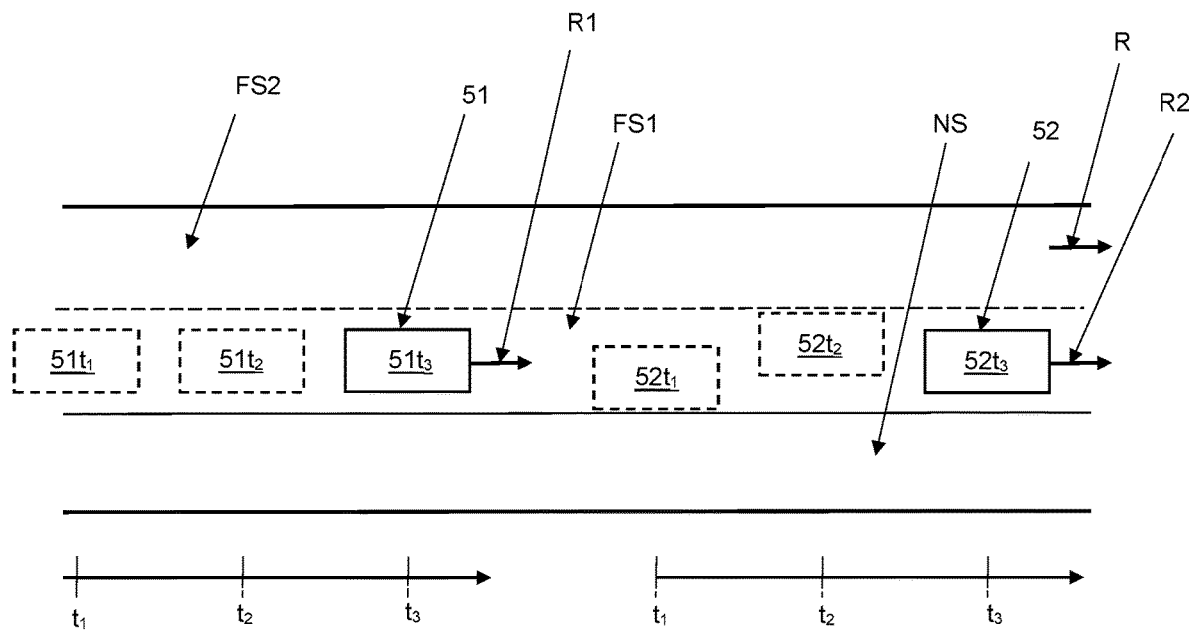
FIG. 26 shows a schematic representation of one side of a highway with an ego-vehicle and a target vehicle according to one exemplary embodiment.

FIG. 26 shows a schematic representation of one side of a highway having two lanes FS1, FS2 with the same direction of travel R is shown. Furthermore, an emergency lane NS or respectively a so-called breakdown lane is provided. Located in the lane FS1 is an ego-vehicle 51 which is moving in the direction of travel R1, and also a target vehicle 52 which is moving in the direction of travel R2. At the time $t_1$, the ego-vehicle 51 is located at a first position $1t_1$ and detects a position $2t_1$ of the target vehicle 52, which deviates from a position to be expected, since said position is not located centrally within the lane FS1. As time progresses, the conduct of the target vehicle 52 within the lane FS1 is then observed. At the time $t_2$, the ego-vehicle 51 is located at a position $51t_2$. The target vehicle 2 is located at this time $t_2$ at a position $52t_2$, which has a lateral deviation from the position $52t_1$. At a time $t_3$, the ego-vehicle 51 is located at a third position $51t_3$ and the target vehicle 52 is located at the time $t_3$ at a position $52t_3$, which shows a lateral deviation both from the first position $52t_1$ and from the second position $52t_2$.

Due to these different positions of the target vehicle 52 within the lane FS1, the driving behavior of the target vehicle 52 is deemed to be irregular and the target vehicle 52 is classed as unsafe.

Figure 27:
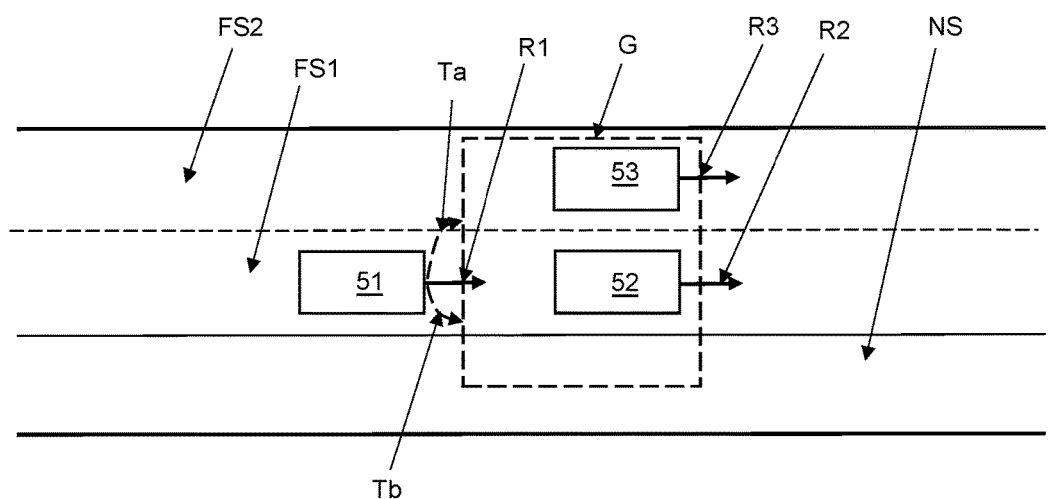
FIG. 27 shows a schematic representation of one side of a highway with an ego-vehicle, a target vehicle, and an additional vehicle according to one exemplary embodiment.

FIG. 27 shows another schematic representation of another exemplary embodiment. In this case, as in FIG. 26, a schematic representation of one side of a highway having two lanes FS1, FS2 with the same direction of travel R is shown. In this case, the ego-vehicle 51 and the target vehicle 52 are located behind one another in the lane FS1. An additional road user 53 is located directly next to the target vehicle 52 in the neighboring lane FS2. The reference numerals R1, R2, and R3 respectively describe the direction of travel of the ego-vehicle 51, the target vehicle 52 and the additional road user 53 and are oriented in the same direction of travel R.

In this case, the ego-vehicle 51 has classified the target vehicle 52 as unsafe, due to its irregular driving behavior. The environment around the target vehicle 52 is subsequently classified as a danger zone G. The additional road user 53 is initially located in the danger zone G and is consequently also classed as unsafe. The ego-vehicle 51 will then, for example, increase the distance from the target vehicle 52 and the additional road user 53, in order to still be able to take evasive action or respectively brake in the event of a possible collision. This is achieved by reducing the speed of the ego-vehicle 51. Alternatively or cumulatively, the ego-vehicle 51 can also alter its trajectory. For example, the ego-vehicle 51 can plan a trajectory Ta, as a result of which the ego-vehicle is located between the lanes FS1 and FS2, in order to shield the danger zone G for following vehicles. Another possibility would be a trajectory Tb, as a result of which the ego-vehicle approaches the emergency lane NS, in order to be able to take evasive action more quickly on said lane in the event of the target vehicle braking suddenly.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practice. Thus, the scope of the embodiments should be determined by the claims and their equivalents, rather than by the examples given.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method for determining an anomalous driving pattern of a neighboring vehicle with a vehicle camera of a present vehicle, comprising:
    receiving image data from the vehicle camera, the image data comprising image frames;
    scanning the image data for lane markings;
    determining if the lane markings are suitable for deriving a trajectory of the neighboring vehicle relative to the lane markings in response to the lane markings being detected in the scanned image data;
    deriving a reference trajectory from the detected lane markings in response to the detected lane markings being suitable for deriving a trajectory;
    deriving the reference trajectory from a motion of the present vehicle in response to lane markings not being detected in the scanned image data;
    determining a trajectory of the neighboring vehicle relative to the reference trajectory;
    deriving characteristic parameters of the determined trajectory;
    comparing the characteristic parameters with predetermined trajectory data;
    determining, based on the comparison, if the trajectory of the neighboring vehicle is an anomalous trajectory; and
    outputting an alert signal in response to the trajectory of the neighboring vehicle being an anomalous trajectory.

2. The method according to claim 1, wherein the predetermined trajectory data comprise a deviation to the left or to the right with respect to the reference trajectory.

3. The method according to claim 1, wherein the predetermined trajectory data comprise a deviation pattern with respect to the reference trajectory.

4. The method according to claim 3, wherein the deviation pattern is a deviation time sequence with respect to the reference trajectory.

5. The method according to claim 3, wherein the deviation pattern comprises a first lateral deviation in a first direction and a subsequent second lateral deviation in a second direction, wherein the second direction is opposite to the first direction.

6. The method according to claim 5, wherein a duration of the second lateral deviation is shorter than a duration of the first lateral deviation.

7. The method according to claim 2, wherein the reference trajectory is derived from an image sequence of a lane marking.

8. The method according to claim 2, wherein the reference trajectory is derived from motion sensor data of the present vehicle.

9. The method according to claim 1, wherein the neighboring vehicle is a preceding vehicle.

10. The method according to claim 1, comprising triggering an alert action if it is determined that the trajectory of the neighboring vehicle is an anomalous trajectory, wherein the action is selected from slowing down the present vehicle, displaying an alert message on the instrument cluster of the present vehicle, sounding an alert signal inside the present vehicle, flashing the front lights of the present vehicle, sounding the horn of the present vehicle, sending a radio message via a radio transmitter of the present vehicle and forwarding the alert message to a collision warning system.

11. An image processing unit for a vehicle, the image processing unit comprising:
    an input connection for receiving image data from a vehicle camera; and
    a computation unit which is operative to
        receive image data from the vehicle camera, the image data comprising image frames,
        scan the image data for lane markings and lane boundaries,
        determine, if lane markings are detected in the image frames, if the detected lane markings are suitable for deriving a trajectory of the neighboring vehicle relative to the lane markings and
        derive a reference trajectory from the detected lane markings, if it is determined that the detected lane markings are suitable,
        derive a reference trajectory from a motion of the present vehicle,
        determine a trajectory of the neighboring vehicles relative to the reference trajectory,
        derive characteristic parameters of the determined trajectory,
        compare the characteristic parameters with predetermined trajectory data,
        determine, based on the comparison, if the trajectory of the neighboring vehicle is an anomalous trajectory, and output an alert signal if it is determined that the trajectory of the neighboring vehicle is an anomalous trajectory.

\* \* \* \* \*